(No Model.)
F. G. FOWLER.
STEAM BOILER.
No. 377,099. Patented Jan. 31, 1888.
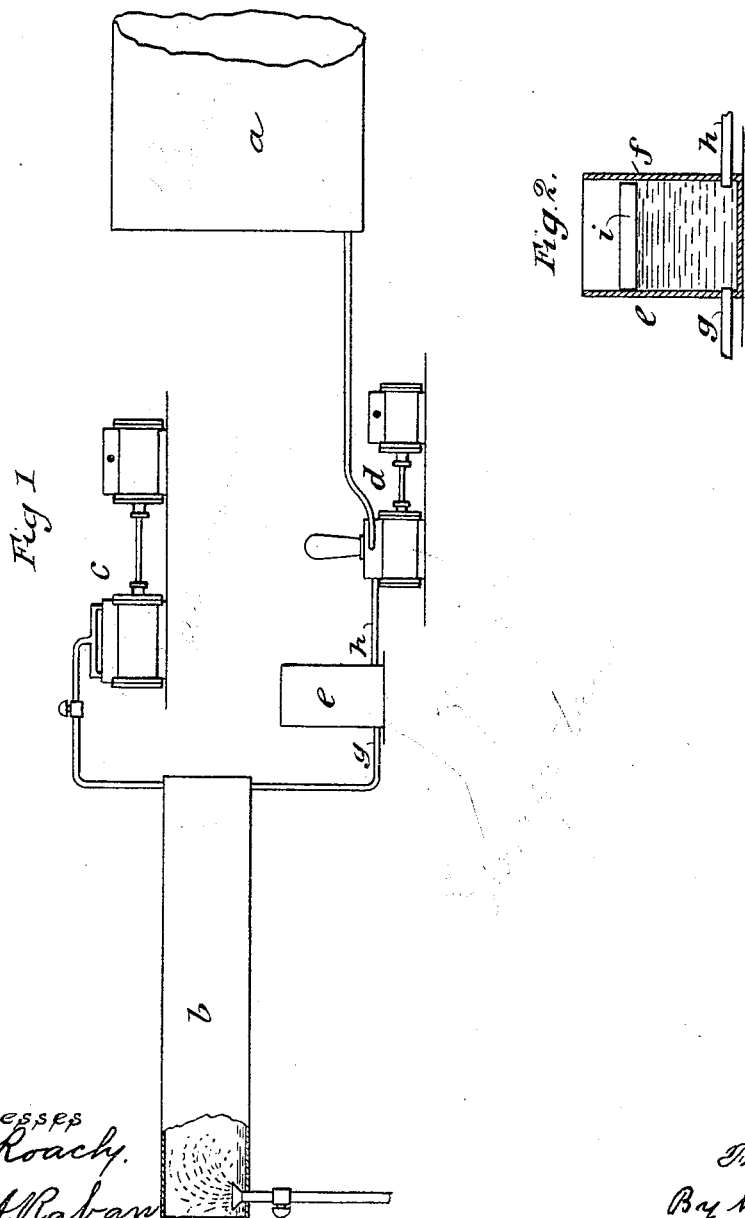
Witnesses
M. J. Roach
W. A. Raban
Inventor
Frank G. Fowler
By his attorneys
Gifford & Brown

UNITED STATES PATENT OFFICE.

FRANK G. FOWLER, OF BRIDGEPORT, CONNECTICUT.

STEAM-BOILER.

SPECIFICATION forming part of Letters Patent No. 377,099, dated January 31, 1888.

Application filed June 25, 1887. Serial No. 242,460. (No model.)

*To all whom it may concern:*

Be it known that I, FRANK G. FOWLER, of Bridgeport, State of Connecticut, have invented a new and useful Improvement Applicable to Steam-Boilers, of which the following is a specification.

In my Patent No. 346,198 I have described a process and apparatus for removing the gases from water before it is used to produce steam. My present invention is designed as an improvement on that described in said patent; and it consists in combining with the boiler and the air-pump or apparatus for extracting the gases from the water a storage-tank wherein the degasified water may be stored, and which is provided with a floating cover, so that the air will be mostly excluded from the water, and yet it will not be prevented from running into the boiler feed-pump by the formation of a vacuum behind it.

I have discovered that when water has been degasified the gases will return into it, but slowly, and that the amount of time required depends upon the amount of surface exposure to the air, and I take advantage of this discovery by constructing my storage-tank with the floating cover.

In the drawings, Figure 1, I have shown a boiler, *a*, a tank, *b*, within which the gas and water are separated, an air-pump, *c*, and a feed-pump, *d*, all as set forth in my former patent; but at *e* is interposed a storage-tank, which is shown more in detail in Fig. 2, and which I will now describe. *f* is the shell of the tank, which is open at the top, with vertical sides. *g* and *h* are respectively the inlet and outlet pipes for the water. *i* is a float, which covers, so far as practicable, the surface of the water and fits loosely within the walls of the tank, so that it may rise and fall freely with the surface of the water. It may be made of wood covered with metal, or of any other substance which will float on the water.

It will be seen that this float will protect the surface of the water almost entirely from contact with the air, and thus fortify it against the reabsorption of gases. At the same time, however, it is no obstacle to the free feeding of the water, because no vacuum is formed behind the water, as if a tight stationary cover were used.

One of the most useful applications of this invention will be to the tenders of locomotives. A pump can be arranged at a station for pumping the gas out of water in a stationary tank, from which it may be conducted into a tender as required. A floating cover within the tender will practically exclude the air from the water until it is used in the boiler of the locomotive, into which it will flow as freely as heretofore.

I claim—

In combination, a steam-boiler, a feed-tank, a pump, C, for extracting the gases from water, a feed-pump, *d*, and a storage-tank interposed between the feed-tank and feed-pump, said storage-tank being provided with a floating cover, substantially as and for the purpose set forth.

FRANK G. FOWLER.

Witnesses:
CURTIS THOMPSON,
ALBERT M. TALLMADGE.